W. S. HOLLAENDER.
DRINKING ATTACHMENT FOR FAUCETS.
APPLICATION FILED JUNE 30, 1919.
1,387,718.
Patented Aug. 16, 1921.
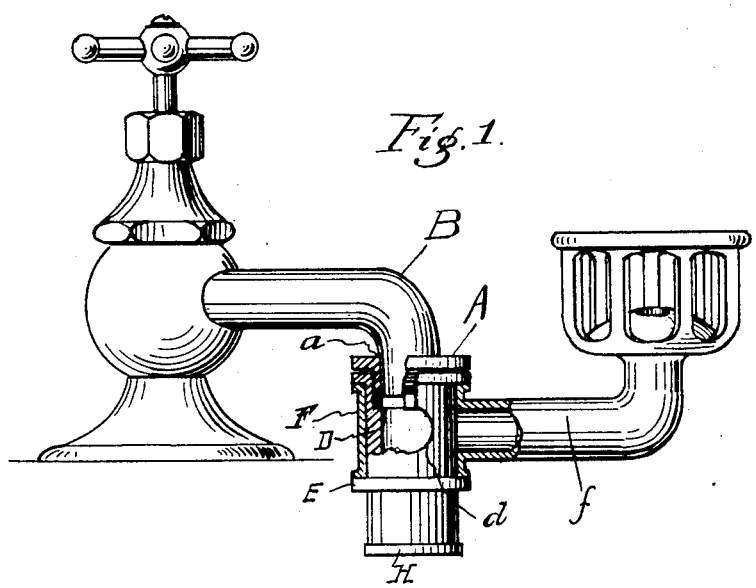
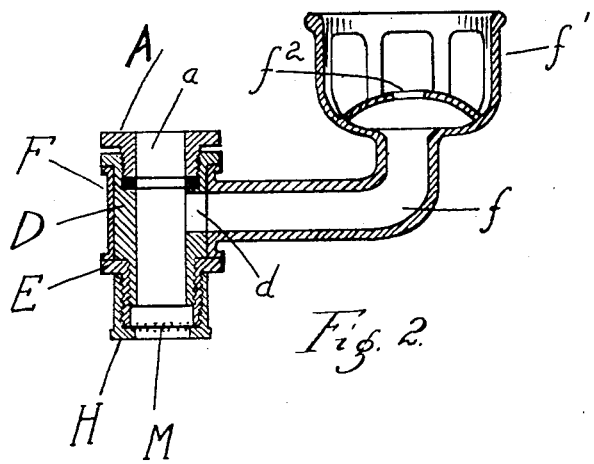
Inventor:
Walter S. Hollaender
By Walter F. Murray
Attorney.

UNITED STATES PATENT OFFICE.

WALTER S. HOLLAENDER, OF CINCINNATI, OHIO.

DRINKING ATTACHMENT FOR FAUCETS.

1,387,718.   Specification of Letters Patent.   Patented Aug. 16, 1921.

Application filed June 30, 1919. Serial No. 307,726.

*To all whom it may concern:*

Be it known that I, WALTER S. HOLLAENDER, a citizen of the United States of America, and a resident of Cincinnati, in the county of Hamilton and State of Ohio, have invented a new and useful Improvement in Drinking Attachments for Faucets, of which the following is a specification.

My invention relates to an attachment that may be attached to an ordinary faucet to provide a convenient means for drinking therefrom.

The object of my invention is an attachment which may be readily brought to position for use, prevents a splashing of the drinker, can be used without interfering with the ordinary flow of water from the faucet and may be attached to any standard faucet.

These objects are attained by the means described in the specification and illustrated in the accompanying drawings, in which:—

Figure 1, is a perspective view of a faucet and of an attachment therefor embodying my invention, the attachment being shown partly in side elevation and partly in section.

Fig. 2, is a central sectional view of the attachment embodying my invention.

My attachment comprises coupling A which has a bore $a$, which fits the end of a faucet B with a driving fit, a pipe section D which engages coupling A, a nut E which fits upon the lower end of the pipe section D, and forms therewith a way upon which the sleeve F of the discharge pipe $f$ is adapted to rotate. Nut E is externally screw threaded to engage the internal screw threads of a collar H between which and the nut E a wire mesh M is held.

Section D has in it an exit opening $d$ with which pipe $f$ may be caused to register. Pipe $f$ terminates in a cup shaped frame work $f'$ which surrounds the exit opening $f^2$.

In use the pipe section D is adjusted upon the coupling A so that bringing pipe $f$ to register with the opening $d$ will place the bubbler $f^2$ in a most convenient position for use. Ordinarily this position would be one directly in front of the faucet. When the sleeve F is in position such that the pipe $f$ registers with the opening $d$, the resistance of the wire mesh M to the flow of the water will divert some of it to the bubbler $f^2$ from which it will discharge in a steady stream or one which is devoid of a force which would cause the water to splash over a person taking a drink. However, when the pipe $f$ is placed out of register with the opening $d$, the mesh M will not perceptibly interfere with the discharge of water from the faucet but will cause it to flow therefrom in a rounded stream which will likewise act as a means of preventing splashing of the water in the washstand or sink.

Having thus described my invention, what I claim is:—

In a drinking attachment for faucets the combination of a pipe section having an opening in its side and an unobstructed passage within it, means for securing the pipe section to a faucet, a sleeve having a bubbler secured thereto and being mounted upon the pipe section so that the bubbler may be brought to register with or be out of registration with the opening in the side of the pipe section and a wire mesh mounted on the pipe section at the lower end of the unobstructed passage therein and adapted to divert water through the bubbler.

In testimony whereof, I have hereunto subscribed my name this 28th day of June, 1919.

WALTER S. HOLLAENDER.